(12) United States Patent
Kiya et al.

(10) Patent No.: US 12,474,094 B2
(45) Date of Patent: Nov. 18, 2025

(54) REFRIGERATION APPARATUS WITH OIL RETURN CONTROL MECHANISM FOR COMPRESSORS

(71) Applicant: Panasonic Intellectual Property Management Co., Ltd., Osaka (JP)

(72) Inventors: Toyoaki Kiya, Saitama (JP); Osamu Kosuda, Saitama (JP); Ryosuke Tsuihiji, Gunma (JP); Ibuki Sukegawa, Gunma (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 18/107,826

(22) Filed: Feb. 9, 2023

(65) Prior Publication Data

US 2023/0251003 A1 Aug. 10, 2023

(30) Foreign Application Priority Data

Feb. 10, 2022 (JP) ................... 2022-019608

(51) Int. Cl.
*F25B 31/00* (2006.01)
*F25B 6/02* (2006.01)
*F25B 41/20* (2021.01)

(52) U.S. Cl.
CPC .............. *F25B 31/004* (2013.01); *F25B 6/02* (2013.01); *F25B 41/20* (2021.01); *F25B 2400/075* (2013.01); *F25B 2700/03* (2013.01); *F25B 2700/191* (2013.01); *F25B 2700/195* (2013.01)

(58) Field of Classification Search
None
See application file for complete search history.

(56) References Cited

U.S. PATENT DOCUMENTS

| 5,586,450 A * | 12/1996 | Tollar .................... F25B 31/002 62/468 |
| 2008/0209924 A1* | 9/2008 | Yoon ...................... F25B 31/004 62/84 |
| 2011/0155816 A1* | 6/2011 | Jeong ..................... F25B 31/004 236/92 B |

(Continued)

FOREIGN PATENT DOCUMENTS

| JP | 05-296583 A | 11/1993 |
| JP | H11-173686 A | 7/1999 |
| JP | 2001124388 A * | 5/2001 .......... F25B 2700/03 |

(Continued)

*Primary Examiner* — Jerry-Daryl Fletcher
*Assistant Examiner* — Daniel C Comings
(74) *Attorney, Agent, or Firm* — Rimon P.C.

(57) ABSTRACT

A refrigeration apparatus includes N refrigeration units each including a compressor, an oil separator, an oil return pipe, and a heat dissipation heat exchanger; N pressure reducing valves each connected to the heat dissipation heat exchanger of a corresponding one of the N refrigeration units; and an oil return control mechanism that controls a return destination of the oil separated by the oil separators of the N refrigeration units. The oil return control mechanism includes an oil supply pipe that connects the oil return pipes of the N refrigeration units to each other, and a flow control mechanism, which controls a flowing condition of oil in the oil supply pipe, disposed in the oil supply pipe.

8 Claims, 5 Drawing Sheets

(56) References Cited

U.S. PATENT DOCUMENTS

2016/0201963 A1\* 7/2016 Shin ................ F25B 27/00
                                                                62/324.4

FOREIGN PATENT DOCUMENTS

| | | |
|---|---|---|
| JP | 2010-127521 A | 6/2010 |
| JP | 2017-138034 A | 8/2017 |
| WO | 2013/073064 A1 | 5/2013 |

\* cited by examiner

REFRIGERATION APPARATUS WITH OIL RETURN CONTROL MECHANISM FOR COMPRESSORS

TECHNICAL FIELD

This application is entitled to and claims the benefit of Japanese Patent Application No. 2022-019608 filed on Feb. 10, 2022, the disclosure of which including the specification, drawings, and abstract is incorporated herein by reference in its entirety.

The present disclosure relates to a refrigeration apparatus.

BACKGROUND ART

Conventionally known is a configuration including a mechanism for separating oil from a refrigerant compressed by a compressor and a mechanism for returning the oil separated from the refrigerant to the compressor (see, for example, Patent Literature (hereinafter, referred to as PTL) 1).

The configuration of PTL 1 includes two compressors disposed in parallel and two oil separators disposed in parallel in a refrigeration cycle and one oil tank. Each compressor is connected to a corresponding one of the oil separators. Each compressor is connected to the oil tank via a first oil distribution pipe that includes a first electromagnetic valve disposed therein. Each oil separator is connected to the oil tank via a corresponding oil return pipe that includes a second electromagnetic valve disposed therein. The bottom of the oil tank is connected to each compressor via a second oil distribution pipe.

During the operation of the refrigeration apparatus, an operation of closing the first electromagnetic valve and opening the second electromagnetic valve (hereinafter referred to as "first operation"), and an operation of opening the first electromagnetic valve and closing the second electromagnetic valve (hereinafter referred to as "second operation") are repeated at predetermined time intervals. When the first operation is performed, the oil separated by each oil separator is returned to the oil tank, and then supplied from the oil tank to each oil separator as the internal pressure of the oil tank rises due to the internal pressure of the oil separators. On the other hand, when the second operation is performed, the internal pressure of the oil tank and the internal pressure of each compressor become equal. Therefore, when the oil levels in the compressors are higher than the oil drain, the oil in the compressors flows to the oil tank through the oil drain. The repetition of the first operation and the second operation allows adjusting of the position of the oil level in each compressor to a predetermined position.

CITATION LIST

Patent Literature

PTL 1

Japanese Patent Application Laid-Open No. H11-173686

SUMMARY OF INVENTION

Technical Problem

In a configuration as described in PTL 1, when the pressure between one compressor and one oil separator differs from the pressure between the other compressor and the other oil separator, the amounts of the oil separated by the oil separators may differ. In such a case, the amount of the oil separated by one of the oil separators becomes almost zero. Even in such a case, the first operation of returning oil from this one oil separator to the oil tank is needlessly performed in the configuration as of PTL 1.

An object of the present disclosure is to provide a refrigeration apparatus capable of appropriately supplying oil separated by oil separators to compressors according to the situation.

Solution to Problem

A refrigeration apparatus of the present disclosure includes: N (N is a natural number equal to or greater than 2) refrigeration units each including a compressor, an oil separator, an oil return pipe that returns oil separated from a refrigerant by the oil separator to the compressor, and a heat dissipation heat exchanger that cools the refrigerant from which the oil has been separated; N pressure reducing valves each connected to the heat dissipation heat exchanger of a corresponding one of the N refrigeration units; and an oil return control mechanism that controls a return destination of the oil separated by at least one of the oil separators of the N refrigeration units. In the refrigeration apparatus, the oil return control mechanism includes an oil supply pipe that connects the oil return pipes of the N refrigeration units to each other and a flow control mechanism disposed in the oil supply pipe, the flow control mechanism controlling a flowing condition of oil in the oil supply pipe.

Advantageous Effects of Invention

A refrigeration apparatus of the present disclosure is capable of appropriately supplying oil separated by oil separators to compressors according to the situation.

DESCRIPTION OF EMBODIMENTS

Embodiments

Hereinafter, the embodiments of the present disclosure will be described.

Configuration of Refrigeration Apparatus

Figure 1:
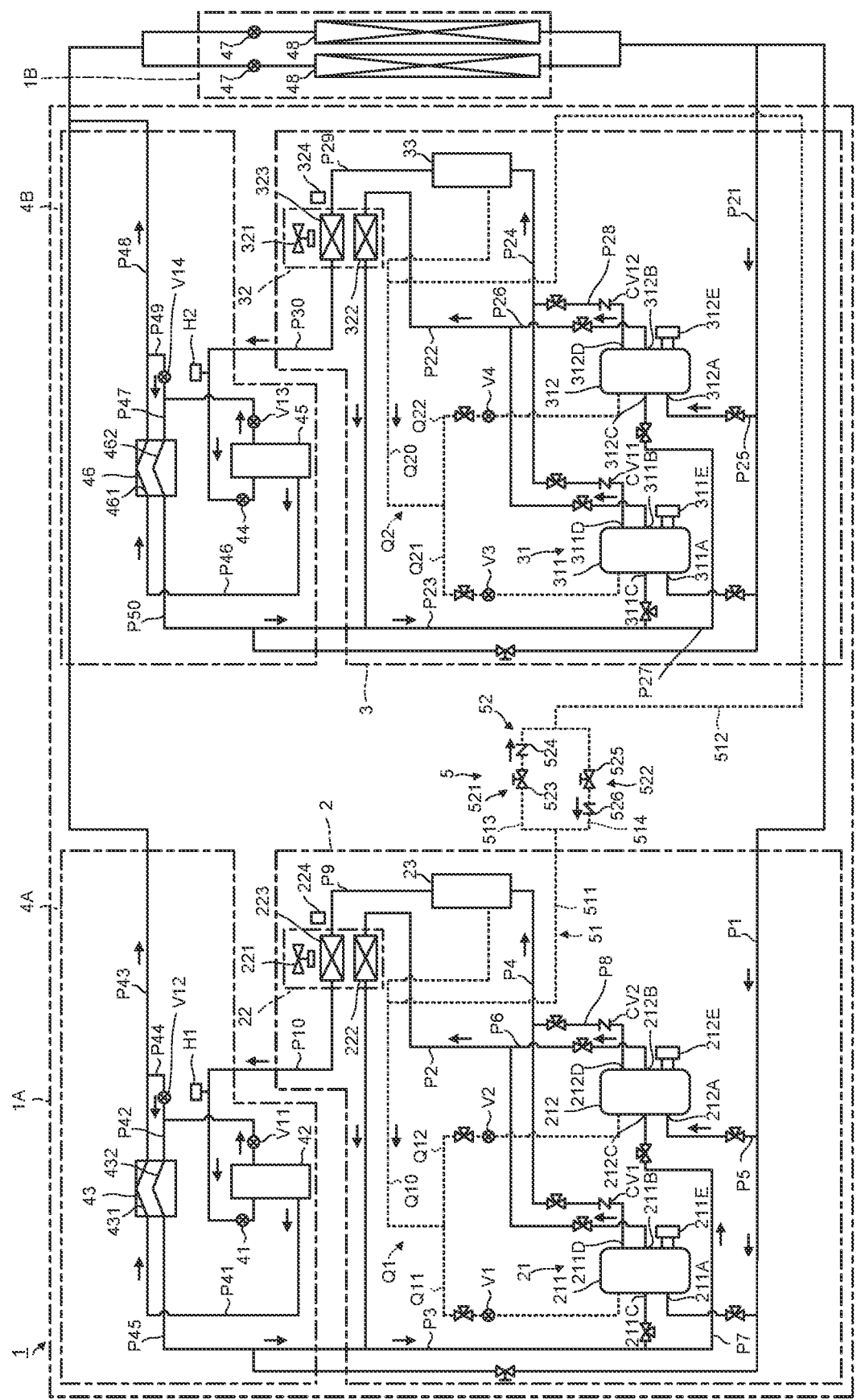
FIG. 1 is a block diagram illustrating a schematic configuration of a refrigeration apparatus.
Figure 2:
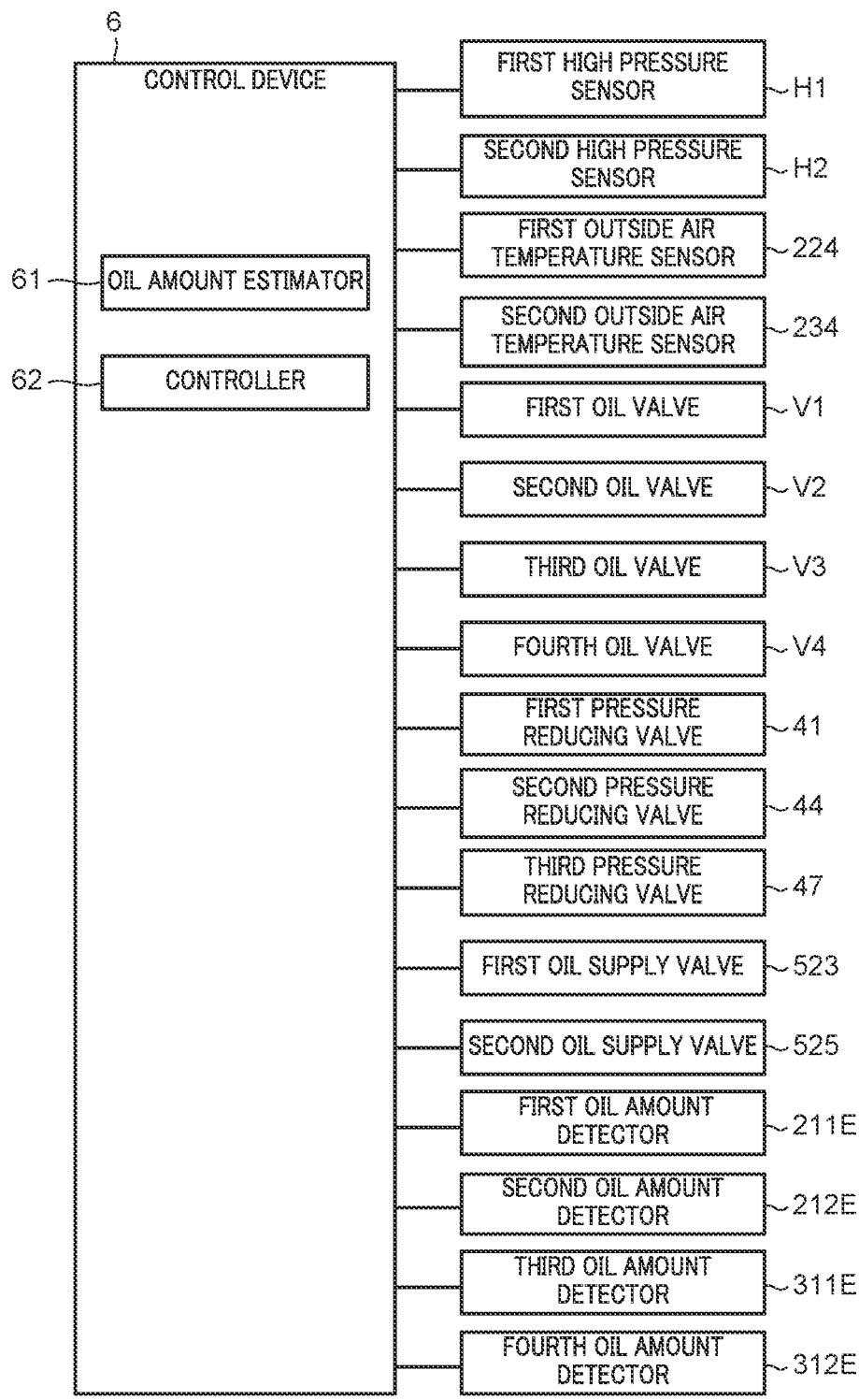
FIG. 2 is a block diagram illustrating a control system of the refrigeration apparatus.
Figure 3:
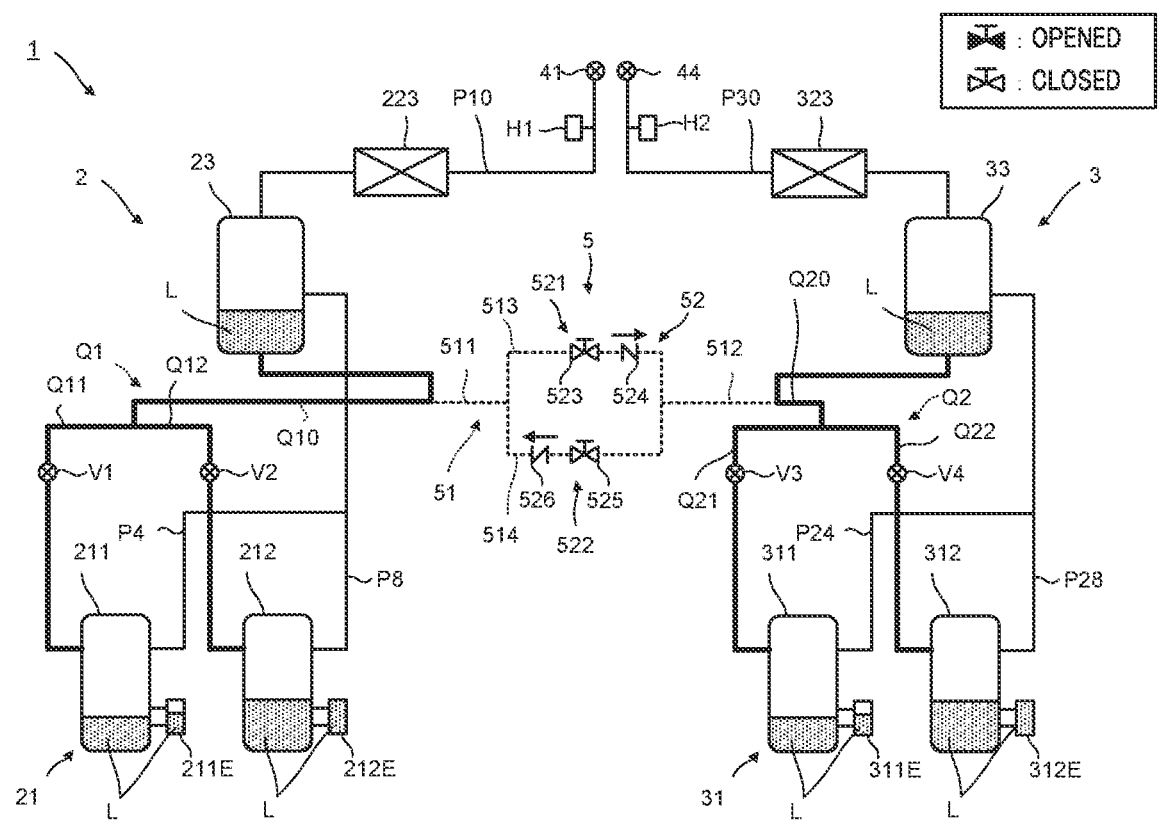
FIG. 3 is an explanatory diagram of first control.
Figure 4:
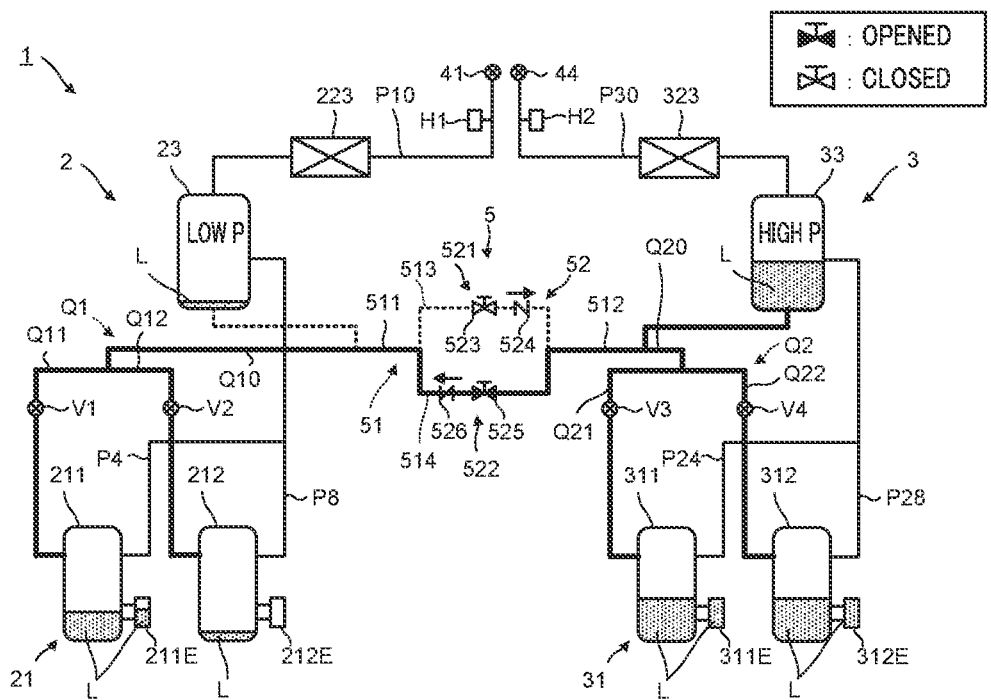
FIG. 4 is an explanatory diagram of first oil supply control.
Figure 5:
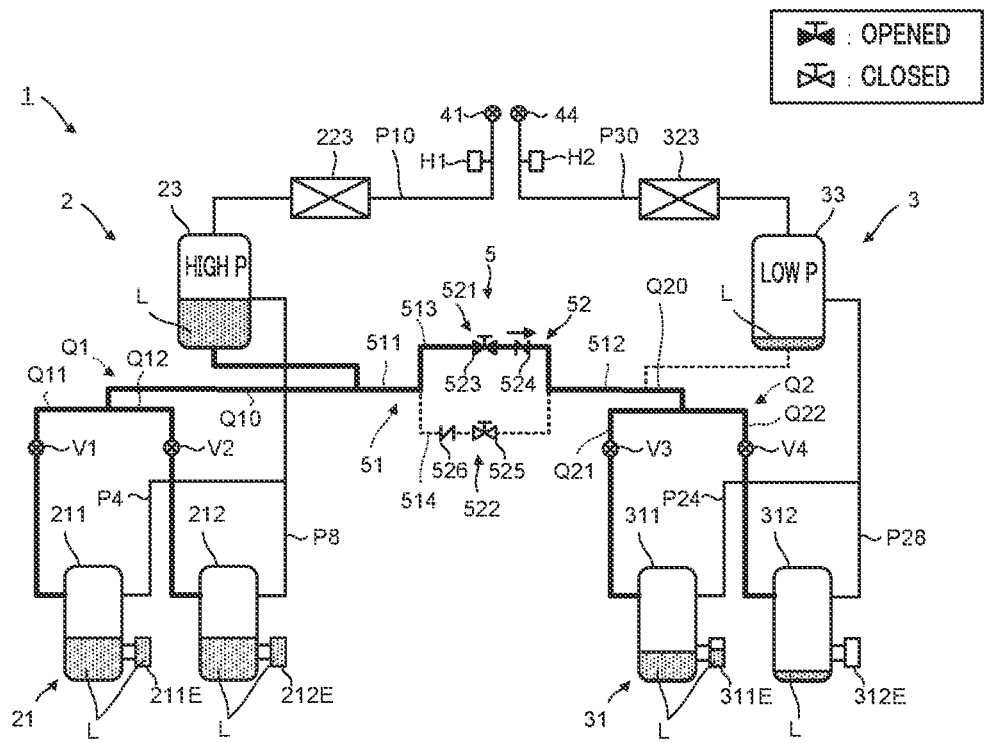
FIG. 5 is an explanatory diagram of second oil supply control.

In the following, the configuration of a refrigeration apparatus will be described. FIG. 1 is a block diagram illustrating a schematic configuration of a refrigeration apparatus. FIG. 2 is a block diagram illustrating a control system of the refrigeration apparatus. FIG. 3 is an explanatory diagram of first control. FIG. 4 is an explanatory diagram of first oil supply control. FIG. 5 is an explanatory diagram of second oil supply control. In FIGS. 4 and 5, "LOW P" refers to "low pressure," and "HIGH P" refers to "high pressure."

Refrigeration apparatus 1 illustrated in FIG. 1 includes refrigerator 1A and cooling unit 1B.

Refrigerator 1A includes first refrigeration unit 2, second refrigeration unit 3, first subcooling mechanism 4A, second subcooling mechanism 4B, and oil return control mechanism 5. In other words, refrigeration apparatus 1 includes N (N is a natural number equal to or greater 2) refrigeration units. First refrigeration unit 2 and second refrigeration unit 3 are disposed in parallel in a refrigeration cycle. First refrigeration unit 2 and second refrigeration unit 3 have substantially the same configuration; thus first refrigeration unit 2 will be described in detail, and second refrigeration unit 3 will be described briefly.

First refrigeration unit 2 includes first compression section 21, first heat exchanger for heat dissipation (herein also referred to as "heat dissipation heat exchanger") 22, and first oil separator 23.

First compression section 21 includes first compressor 211 and second compressor 212. First compressor 211 and second compressor 212 are disposed in parallel in a refrigeration cycle. First compression section 21 may include one compressor or three or more compressors. When first compression section 21 includes three or more compressors, the three or more compressors are disposed in parallel in the refrigeration cycle. First compressor 211 and second compressor 212 have substantially the same configuration; thus first compressor 211 will be described in detail, and second compressor 212 will be described briefly.

First compressor 211 includes an hermetic container. At the hermetic container, first low-stage suction port 211A, first low-stage discharge port 211B, first high-stage suction port 211C, and first high-stage discharge port 211D are formed. A pair of evaporators 48 of cooling unit 1B are connected to first low-stage suction port 211A via pipe P1. First intercooler 222 of first heat dissipation heat exchanger 22 is connected to first low-stage discharge port 211B via pipe P2. First intercooler 222 is connected to first high-stage discharge port 211C via pipe P3. First oil separator 23 is connected to first high-stage discharge port 211D via pipe P4. Check valve CV1 is disposed in pipe P4 to prevent a refrigerant discharged from first high-stage discharge port 211D from flowing back to first high-stage discharge port 211D.

A first low-stage compression element, a first high-stage compression element, and a first motor (all not illustrated) are disposed in the hermetic container of first compressor 211. The first low-stage compression element and the first high-stage compression element rotate in synchronization with the rotation of the first motor.

When the first motor rotates, the first low-stage compression element increases the pressure of a low-pressure refrigerant, sucked from the pair of evaporators 48 via pipe P1 and first low-stage suction port 211A, to intermediate pressure. The first low-stage compression element discharges the refrigerant pressurized to have the intermediate pressure to first intercooler 222 via first low-stage discharge port 211B and pipe P2. The first high-stage compression element increases the intermediate pressure of the refrigerant, sucked from first intercooler 222 via first high-stage suction port 211C and pipe P3, to high pressure. The first high stage compression element discharges the refrigerant pressurized to have the high pressure to first oil separator 23 via first high-stage discharge port 211D and pipe P4. As described above, first compressor 211 compresses a refrigerant in two stages.

Second compressor 212 includes an hermetic container at which second low-stage suction port 212A, second low-stage discharge port 212B, second high-stage suction port 212C, and second high-stage discharge port 212D are formed. The pair of evaporators 48 are connected to second low-stage suction port 212A via pipe P5 branched from pipe P1. First intercooler 222 is connected to second low-stage discharge port 212B via pipe P6 branched from pipe P2. First intercooler 222 is connected to second high-stage suction port 212C via pipe P7 branched from pipe P3. First oil separator 23 is connected to second high-stage discharge port 212D via pipe P8 branched from pipe P4. Check valve CV2 is disposed in pipe P8.

A second low-stage compression element, a second high-stage compression element, and a second motor (all not illustrated) are disposed in the hermetic container of second compressor 212. In a manner similar to first compressor 211, second compressor 212 compresses a refrigerant in two stages by rotating the second low-stage compression element and the second high-stage compression element in synchronization with the rotation of the second motor.

At the hermetic container of first compressor 211, first oil amount detector 211E for detecting the remaining amount of oil in the hermetic container is disposed. At the hermetic container of second compressor 212, second oil amount detector 212E for detecting the remaining amount of oil is disposed. First and second oil amount detectors 211E and 212E are configured from, for example, oil level switches, and the detectors output signals corresponding to the detected remaining amounts to control device 6 illustrated in FIG. 2.

First heat dissipation heat exchanger 22 includes first heat dissipation fan 221, first intercooler 222, and first gas cooler 223.

First heat dissipation fan 221 cools first intercooler 222 and first gas cooler 223.

First intercooler 222 cools refrigerants with intermediate pressure discharged from first and second low-stage compression elements of first and second compressors 211 and 212, and discharges the refrigerants to the first and second high-stage compression elements.

First gas cooler 223 is connected to first oil separator 23 via pipe P9. First gas cooler 223 is connected to first intermediate cooler 42 of first subcooling mechanism 4A via pipe P10. First gas cooler 223 cools a high-pressure refrigerant discharged from first oil separator 23 and discharges the refrigerant to first intermediate cooler 42.

First outside air temperature sensor 224 is disposed in the vicinity of first heat dissipation heat exchanger 22. First outside air temperature sensor 224 outputs a signal corresponding to the detection result of an outside air temperature to control device 6.

First oil separator 23 is connected to the hermetic containers of first compressor 211 and second compressor 212 via first oil return pipe Q1. First oil return pipe Q1 includes first base pipe Q10, first branch pipe Q11, and second branch pipe Q12. One end of first base pipe Q10 is connected to first oil separator 23. First branch pipe Q11 connects the other end of first base pipe Q10 with the hermetic container of first compressor 211. Second branch pipe Q12 connects the other end of first base pipe Q10 with the hermetic container of second compressor 212. First oil separator 23 separates oil contained in high-pressure refrigerants discharged from the first and second high-stage compression elements of first and second compressors 211 and 212 and stores the oil. First oil separator 23 returns the stored oil to first and second compressors 211 and 212 via first oil return pipe Q1.

First oil valve V1 is disposed in first branch pipe Q11. Second oil valve V2 is disposed in second branch pipe Q12. First oil valve V1 and second oil valve V2 are each configured from, for example, an electric valve, and opened and closed under the control of control device 6. The return destination of the oil from first oil separator 23 is controlled by adjusting the opening degrees of first oil valve V1 and second oil valve V2.

Second refrigeration unit 3 includes second compression section 31, second heat dissipation heat exchanger 32, and second oil separator 33.

Second compression section 31 includes third compressor 311 and fourth compressor 312.

The pair of evaporators 48 are connected to third low-stage suction port 311A of third compressor 311 via pipe P21 branched from pipe P1. Second intercooler 322 of second heat dissipation heat exchanger 32 is connected to third low-stage discharge port 311B of third compressor 311 via pipe P22. Second intercooler 322 is connected to third high-stage suction port 311C of third compressor 311 via pipe P23. Second oil separator 33 is connected to third high-stage discharge port 311D of third compressor 311 via pipe P24. Check valve CV11 is disposed in pipe P24.

A third low-stage compression element, a third high-stage compression element, and a third motor (all not illustrated) are disposed in the hermetic container of third compressor 311. In a manner similar to first compressor 211, third compressor 311 compresses a refrigerant in two stages by rotating the third low-stage compression element and the third high-stage compression element in synchronization with the rotation of the third motor.

The pair of evaporators 48 are connected to fourth low-stage suction port 312A of fourth compressor 312 via pipe P25 branched from pipe P21. Second intercooler 322 is connected to fourth low-stage discharge port 312B of fourth compressor 312 via pipe P26 branched from pipe P22. Second intercooler 322 is connected to fourth high-stage suction port 312C of fourth compressor 312 via pipe P27 branched from pipe P23. Second oil separator 33 is connected to fourth high-stage discharge port 312D of fourth compressor 312 via pipe P28 branched from pipe P24. Check valve CV12 is disposed in pipe P28.

A fourth low-stage compression element, a fourth high-stage compression element, and a fourth motor (all not illustrated) are disposed in the hermetic container of fourth compressor 312. In a manner similar to third compressor 311, fourth compressor 312 compresses a refrigerant in two stages by rotating the fourth low-stage compression element and the fourth high-stage compression element in synchronization with the rotation of the fourth motor.

Third oil amount detector 311E is disposed at the hermetic container of third compressor 311. Fourth oil amount detector 312E is disposed at the hermetic container of fourth compressor 312. Third and fourth oil amount detectors 311E and 312E are configured from, for example, oil level switches, and the detectors output signals corresponding to the remaining amounts of oil in the hermetic containers of third and fourth compressors 311 and 312 to control device 6.

Second heat dissipation heat exchanger 32 includes second heat dissipation fan 321, second intercooler 322, and second gas cooler 323. Second gas cooler 323 is connected to second oil separator 33 via pipe P29. Second gas cooler 323 is connected to second intermediate cooler 45 of second subcooling mechanism 4B via pipe P30. Second outside air temperature sensor 324 is disposed in the vicinity of second heat dissipation heat exchanger 32. Second outside air temperature sensor 324 outputs a signal corresponding to the detection result of an outside air temperature to control device 6.

Second oil separator 33 is connected to the hermetic containers of third compressor 311 and fourth compressor 312 via second oil return pipe Q2 including second base pipe Q20, third branch pipe Q21, and fourth branch pipe Q22. Second oil separator 33 separates oil contained in high-pressure refrigerants discharged from third and fourth compressors 311 and 312 and returns the separated oil to third and fourth compressors 311 and 312. Third oil valve V3 and fourth oil valve V4 that are opened and closed under the control of control device 6 are disposed in third branch pipe Q21 and fourth branch pipe Q22, respectively. Third oil valve V3 and fourth oil valve V4 are each configured from, for example, an electric valve.

First high pressure sensor H1 is disposed in pipe P10. Second high pressure sensor H2 is disposed in pipe P30. First and second high pressure sensors H1 and H2 output signals corresponding to the pressure of pipe P10 and the pressure of pipe P30 to control device 6. The pressure detected by first high pressure sensor H1 is approximately the same as the pressure inside first gas cooler 223 and the pressure inside first oil separator 23. The pressure detected by second high pressure sensor H2 is approximately the same as the pressure inside second gas cooler 323 and the pressure inside second oil separator 33.

First subcooling mechanism 4A includes first pressure reducing valve 41, first intermediate cooler 42, and first split heat exchanger 43. Second subcooling mechanism 4B includes second pressure reducing valve 44, second intermediate cooler 45, and second split heat exchanger 46. In other words, refrigeration apparatus 1 includes N pressure reducing valves—N being the same number as that of the refrigeration unit. First pressure reducing valve 41 and second pressure reducing valve 44 have substantially the same configuration. First intermediate cooler 42 and second intermediate cooler 45 have substantially the same configuration, and first split heat exchanger 43 and second split heat exchanger 46 have substantially the same configuration. Therefore, first pressure reducing valve 41, first intermediate cooler 42, and first split heat exchanger 43 will be described in detail, and second pressure reducing valve 44, second intermediate cooler 45, and second split heat exchanger 46 will be described briefly.

First pressure reducing valve 41 is configured from, for example, an electric valve. First pressure reducing valve 41 is disposed in pipe P10 closer to first intermediate cooler 42 than first high pressure sensor H1 is. First pressure reducing valve 41 reduces the pressure of a high-pressure refrigerant discharged from first gas cooler 223 and discharges the refrigerant into the upper portion of first intermediate cooler 42.

The lower portion of first intermediate cooler 42 is connected to one end of first flow channel 431 of first split heat exchanger 43 via pipe P41. The upper portion of first intermediate cooler 42 is connected to one end of second flow channel 432 of first split heat exchanger 43 via pipe P42. First gas return electric valve (namely, electric valve for returning gas) V11 is disposed in pipe P42. First intermediate cooler 42 cools the refrigerant decompressed by first pressure reducing valve 41. The refrigerant (liquid refrigerant) liquefied by the cooling is discharged to first flow channel 431 of first split heat exchanger 43 via pipe P41. The refrigerant (gas refrigerant) that has not been liquefied by the cooling is discharged to second flow channel 432 of first split heat exchanger 43 via pipe P42.

The other end of first flow channel 431 of first split heat exchanger 43 is connected to the pair of evaporators 48 via pipe P43. Pipe P44 branched from pipe P42 is connected to pipe P43 at a position between the ends of pipe P43. First liquid return electric valve (namely, electric valve for returning liquid) V12 is disposed in pipe P44. The other end of second flow channel 432 of first split heat exchanger 43 is connected to pipe P3 via pipe P45.

In first split heat exchanger 43 having such a configuration, when first liquid return electric valve V12 is open, the following occurs: while the majority of the liquid refrigerant discharged from first intermediate cooler 42 flows into evaporator 48 through first flow channel 431 and pipe P43, the rest of the liquid refrigerant passes through pipes P44 and P42 and flows into second flow channel 432. As the rest of the liquid refrigerant flows into second flow channel 432, the refrigerant passing through first flow channel 431 toward evaporators 48 is supercooled. The gas refrigerant discharged from first intermediate cooler 42 passes through pipe P42, second flow channel 432, and pipes P45, P3, and P7 to return to the first and second high-stage compression elements of first and second compressors 211 and 212.

Second pressure reducing valve 44 is configured from, for example, an electric valve, and is disposed in pipe P30 closer to second intermediate cooler 45 than second high pressure sensor H2 is.

The lower portion of second intermediate cooler 45 is connected to one end of third flow channel 461 of second split heat exchanger 46 via pipe P46. The upper portion of second intermediate cooler 45 is connected to one end of fourth flow channel 462 of second split heat exchanger 46 via pipe P47 that includes second gas return electric valve V13 disposed therein.

The other end of third flow channel 461 of second split heat exchanger 46 is connected to evaporators 48 via pipe P48 branched from pipe P43. Pipe P49 branched from pipe P47 is connected to pipe P48 at a position between the ends of pipe P48. Second liquid return electric valve V14 is disposed in pipe P49. The other end of fourth flow channel 462 of second split heat exchanger 46 is connected to pipe P23 via pipe P50.

In second split heat exchanger 46 having such a configuration, a refrigerant passes through third flow channel 461 toward evaporators 48 is supercooled. The gas refrigerant discharged from second intermediate cooler 45 passes through pipe P47, fourth flow channel 462, and pipes P50, P23, and P27 to return to the third and fourth high-stage compression elements of third and fourth compressors 311 and 312.

Cooling unit 1B is disposed, for example, in a showcase. Cooling unit 1B includes a pair of third pressure reducing valves 47 and the pair of evaporators 48.

Pipe P43 is branched into two at a position located closer to evaporators 48 than the connecting portion, where pipe 43 connects with pipe P48, is. Third pressure reducing valve 47 is disposed at each of the two branched portions. In addition, evaporator 48 is connected to the distal end of each of the two branched portions. Pipe P1 is branched into two at a position located closer to evaporators 48 than the connecting portion, where pipe 1 connects with pipe P21, is. Evaporator 48 is connected to the distal end of each of the two branched portions.

Each third pressure reducing valve 47 is configured from, for example, an electric valve. Third pressure reducing valves 47 reduce the pressure of refrigerants discharged from first and second split heat exchangers 43 and 46 and discharge the refrigerants to evaporators 48.

Each evaporator 48 generates cooling air for cooling an object to be cooled by exchanging heat between a liquid refrigerant flowing from corresponding third pressure reducing valve 47 and air around evaporator 48. After the heat exchange, the refrigerant passes through pipes P1, P5, P21, and P25, and returns to the first, second, third, and fourth low-stage compression elements of first, second, third, and fourth compressors 211, 212, 311, and 312.

Oil return control mechanism 5 controls the return destination of the oil separated by first and second oil separators 23 and 33 of first and second refrigeration units 2 and 3.

Oil return control mechanism 5 includes oil supply pipe 51 and flow control mechanism 52.

Oil supply pipe 51 connects first base pipe Q10 of first oil return pipe Q1, connected to first oil separator 23, with second base pipe Q20 of second oil return pipe Q2, connected to second oil separator 33. Oil supply pipe 51 includes first base pipe for supplying oil (herein also referred to as "oil supply base pipe") 511, second oil supply base pipe 512, first branch pipe for supplying oil (herein also referred to as "oil supply branch pipe") 513, and second oil supply branch pipe 514. One end of first oil supply base pipe 511 is connected to first base pipe Q10 of first oil return pipe Q1. One end of first oil supply branch pipe 513 and one end of second oil supply branch pipe 514 are connected to the other end of first oil supply base pipe 511. One end of second oil supply base pipe 512 is connected to second base pipe Q20 of second oil return pipe Q2. The other end of first oil supply branch pipe 513 and the other end of second oil supply branch pipe 514 are connected to the other end of second supply base pipe 512.

Flow control mechanism 52 is disposed in the oil supply pipe 51 and controls the flowing condition of oil in oil supply pipe 51. Flow control mechanism 52 includes first regulating mechanism 521 and second regulating mechanism 522 disposed in parallel in oil supply pipe 51.

First regulating mechanism 521 is disposed in first oil supply branch pipe 513. First regulating mechanism 521 includes first oil supply valve 523 and first check valve for oil supply (herein also referred to as "oil supply check valve") 524 disposed in series. Second regulating mechanism 522 is disposed in second oil supply branch pipe 514. Second regulating mechanism 522 includes second oil supply valve 525 and second oil supply check valve 526 disposed in series. First oil supply valve 523 and second oil supply valve 525 are each configured from, for example, an electromagnetic valve, and opened and closed under the control of control device 6. First oil supply check valve 524 is disposed at a position closer to second refrigeration unit 3 than first oil supply valve 523 is. First oil supply check valve 524 is configured to prevent oil, flowing from first oil supply valve 523 toward second refrigeration unit 3, from flowing back to first oil supply valve 523. Second oil supply check valve 526 is disposed at a position closer to first refrigeration unit 2 than second oil supply valve 525 is. Second oil supply check valve 526 is configured to prevent oil, flowing from second oil supply valve 525 toward first refrigeration unit 2, from flowing back to second oil supply valve 525. In other words, first oil supply check valve 524 and second oil supply check valve 526 are disposed in such a way that the valves allow oil to flow only in respective directions different from each other.

Control device 6 illustrated in FIG. 2 controls the operation of the entire refrigeration apparatus 1. Control device 6 is configured in such a way that signals can be sent and received between first and second high pressure sensors H1 and H2, first and second outside air temperature sensors 224 and 324, first to fourth oil valves V1 to V4, first, second, and third pressure reducing valves 41, 44, and 47, first and second oil supply valves 523 and 525, and first, second, third, and fourth oil amount detectors 211E, 212E, 311E, and 312E. Control device 6 includes oil amount estimator 61 and controller 62.

Oil amount estimator 61 determines whether or not the oil amounts in first and second oil separators 23 and 33 are less than a first threshold based on the detection results of first, second, third, and fourth oil amount detectors 211E, 212E, 311E, and 312E. In the above configuration, the oil amounts in first and second oil separators 23 and 33 are estimated by using oil amount detectors, which are typically disposed in the compressors. Therefore, the provision of a new configuration for detecting the oil amounts in first and second oil separators 23 and 33 in refrigeration apparatus 1 becomes unnecessary.

Controller 62 performs the following control: first control to independently circulate oil in first refrigeration unit 2 and oil in second refrigeration unit 3 by controlling oil return control mechanism 5 and first and second pressure reducing valves 41 and 44, as illustrated in FIG. 3; and second control to supply, into a predetermined refrigeration unit, oil in other refrigeration unit. The second control includes the following: first oil supply control to supply oil separated by second oil separator 33 of second refrigeration unit 3 to second compression section 31 of second refrigeration unit 3 and to first compression section 21 of first refrigeration unit 2, as illustrated in FIG. 4; and second oil supply control to supply oil separated by first oil separator 23 of first refrigeration unit 2 to first compression section 21 and second compression section 31, as illustrated in FIG. 5. Controller 62 performs the first control when oil amount estimator 61 estimates that the oil amounts in first and second oil separators 23 and 33 are equal to or greater than the first threshold. On the other hand, controller 62 performs the first oil supply control when oil amount estimator 61 estimates that the oil amount in first oil separator 23 is less than the first threshold. In addition, controller 62 performs the second oil supply control when oil amount estimator 61 estimates that the oil amount in second oil separator 33 is less than the first threshold.

In the following, the reason for performing the second control will be described. When the first control is performed by driving first and second compression sections 21 and 31, refrigerants containing oil (hereinafter may be referred to as "oil-containing refrigerants") pass through first and second oil separators 23 and 33 and return to first and second compression sections 21 and 31 via first and second gas coolers 223 and 323, first, second, and third pressure reducing valves 41, 44, and 47, and evaporators 48 in some cases. In such cases, when the amounts of the oil-containing refrigerants returning to first and second compression sections 21 and 31 are substantially the same, the amounts of oil circulating in first and second refrigeration units 2 and 3 in the first control become substantially the same. The amounts of oil separated by first and second oil separators 23 and 33 thus become substantially the same. As a result, both of the oil amounts in first and second oil separators 23 and 33 are equal to or greater than the first threshold. The first threshold is set to a value such that the oil amounts in first, second, third, and fourth compressors 211, 212, 311, and 312 are adjusted to be equal to or greater than the second threshold by returning oil stored in first oil separator 23 to first and second compressors 211 and 212, or returning oil stored in second oil separator 33 to third and fourth compressors 311 and 312.

However, for example, the amounts of oil circulating in first and second refrigeration units 2 and 3 in the first control differ to each other in the following cases.

(1) When the amounts of oil-containing refrigerants returning from evaporators 48 to first, second, third, and fourth compressors 211, 212, 311, and 312 differ from each other depending on how the oil-containing refrigerants are divided during the returning.

(2) When the speed, at which the oil is removed from a separator, varies between first and second oil separators 23 and 33 because the speed of oil returning from first oil separator 23 to first compression section 21 differs from the speed of oil returning from second oil separator 33 to second compression section 31—this difference in the oil speed is caused by the difference between the intermediate pressure and the high pressure in a refrigeration unit varies between first and second refrigeration units 2 and 3.

(3) When the operating frequencies of first and second compressors 211 and 212 forming first compression section 21 differ from the operating frequencies of third and fourth compressors 311 and 312 forming second compression section 31.

In such cases, for example, the amount of oil in first oil separator 23 becomes less than the first threshold, and the amount of oil in at least one of first and second compressors 211 and 212 cannot be adjusted to be equal to or greater than the second threshold. The second control is performed to prevent the occurrence of such problems.

Specific processing performed by oil amount estimator 61 and controller 62 will be described below.

Figure 6:
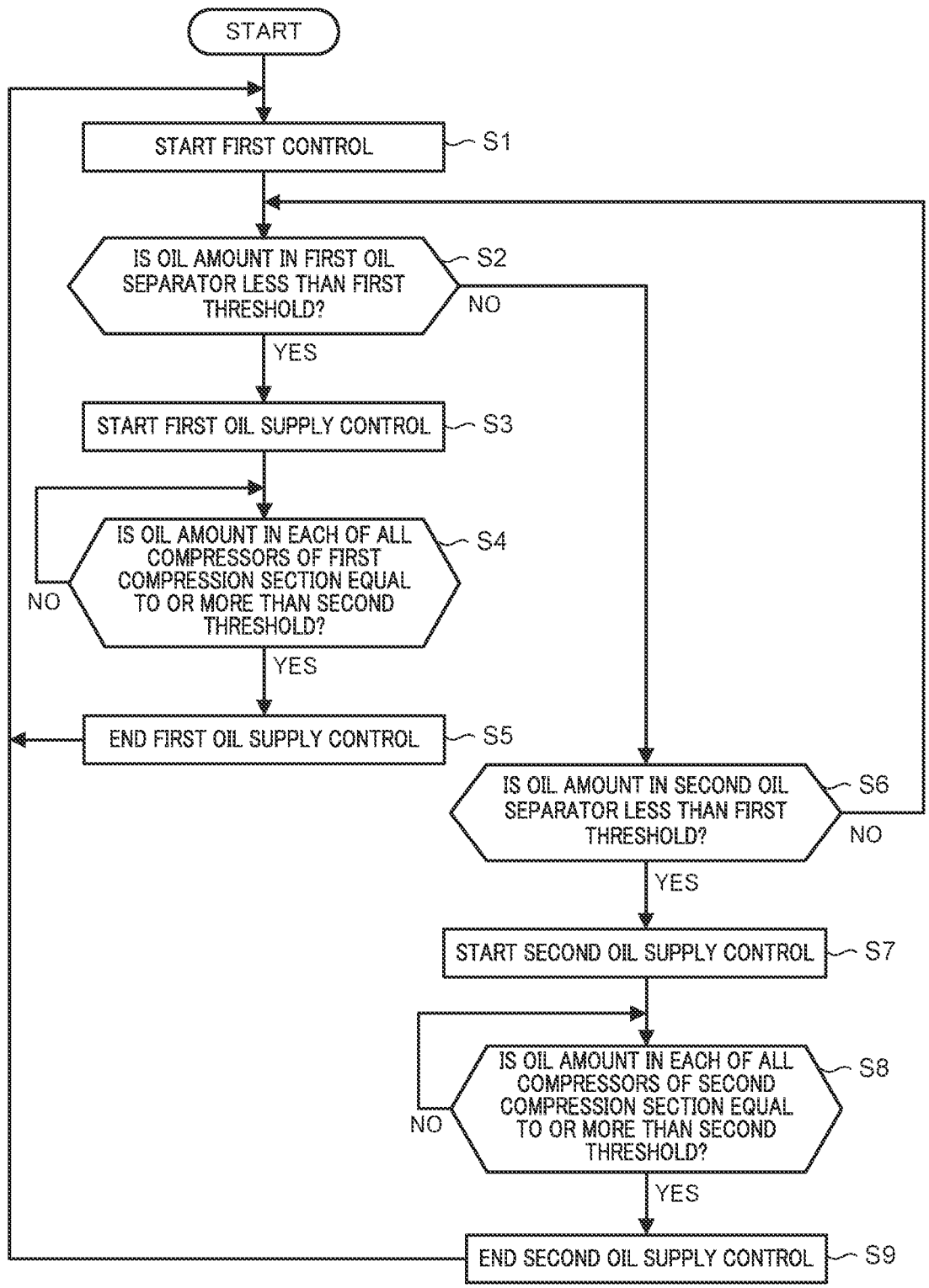
FIG. 6 is a flowchart illustrating the operation of the refrigeration apparatus.

In the following, the operation of refrigeration apparatus 1 will be described with reference to FIGS. 3 to 6. An exemplary operation of cooling an object to be cooled by using refrigerants that have been two-stage compressed by first, second, third, and fourth compressors 211, 212, 311, and 312 will be described. In a case where an object to be cooled is cooled by using refrigerants that have been two-stage compressed by at least one compressor forming first compression section 21 and at least one compressor forming second compression section 31, an operation similar to the operation described below is performed. In FIGS. 3 to 5, when a symbol showing corresponding one of first and second oil supply valves 523 and 525 is black, the symbol represents the opened state of the valve, and when the symbol is white, the symbol represents the closed state of the valve. FIG. 6 is a flowchart illustrating the operation of the refrigeration apparatus.

When a user operates the operation section (not illustrated) to issue a command to start the operation of refrigeration apparatus 1, controller 62 starts the first control (step S1). At the start of the first control, controller 62 closes first and second oil supply valves 523 and 525 of oil return control mechanism 5, as illustrated in FIG. 3. Controller 62 then starts the operation of first and second compression sections 21 and 31. When the operation of first and second compression sections 21 and 31 is started, a refrigerant that has been two-stage compressed by first compression section 21 flows into first oil separator 23 and a refrigerant that has been two-stage compressed by second compression section 31 flows into second oil separator 33.

Oil separated from the refrigerant by first oil separator 23 is stored in first oil separator 23. Oil separated from the refrigerant by second oil separator 33 is stored in second oil separator 33. Based on the detection results of first and second oil amount detectors 211E and 212E, controller 62 supplies oil L in first oil separator 23 to first and second compressors 211 and 212 in such a way that the amounts of oil L in first compressor 211 and oil L in second compressor 212 are adjusted to be equal to or greater than the second threshold. For example, controller 62 keeps first oil valve V1 open until the amount of oil L in first compressor 211 becomes equal to or greater than the second threshold. Controller 62 reduces the opening degree of first oil valve V1 when the amount of oil L becomes equal to or greater than the second threshold. At this time, the pressure in first oil separator 23 is higher than the pressure in the portion into which oil L flows in first compressor 211. Due to the pressure difference, oil L in first oil separator 23 is supplied into first compressor 211. In addition, based on the detection results of third and fourth oil amount detectors 311E and 312E, controller 62 supplies oil L in second oil separator 33 to third and fourth compressors 311 and 312 in such a way that the amounts of oil L in third compressor 311 and oil L in fourth compressor 312 are adjusted to be equal to or greater than the second threshold.

The refrigerants that have passed through first and second oil separators 23 and 33 are decompressed by first, second, and third pressure reducing valves 41, 44 and 47 and used to generate cooling air in evaporators 48.

During the first control, controller 62 controls first and second pressure reducing valves 41 and 44 based on the detection results from first and second outside air temperature sensors 224 and 324 in such a way that the pressure in first and second oil separators 23 and 33 is adjusted to be a target high pressure value based on the outside air temperature. Specifically, controller 62 controls first and second pressure reducing valves 41 and 44 in such a way that the higher the outside air temperature, the higher the pressure detected by first and second high pressure sensors H1 and H2.

Oil amount estimator 61 then estimates whether or not the amount of oil L in first oil separator 23 is less than the first threshold (step S2). For example, when the amount of oil L in at least one of first compressor 211 and second compressor 212 is less than the second threshold for a predetermined time or longer, oil amount estimator 61 estimates that the amount of oil L in first oil separator 23 is less than the first threshold.

For example, when the amount of oil L in first oil separator 23 is estimated to be less than the first threshold because the amount of oil L in second compressor 212 is less than the second threshold (step S2: YES) as illustrated in FIG. 4, controller 62 starts the first oil supply control (step S3). Controller 62 opens second oil supply valve 525 of second regulating mechanism 522 at the start of the first control. Such control maintains the state in which oil L in second oil separator 33 is supplied to third and fourth compressors 311 and 312. Further, the pressure in second oil separator 33 is higher than the pressure in the portion into which oil L flows in first compression section 21. Oil L in second oil separator 33 is thus supplied via second regulating mechanism 522 to one of first compressor 211 and second compressor 212, that is, to the compressor in which the amount of oil L is less than the second threshold.

In addition, controller 62 controls first and second pressure reducing valves 41 and 44 in such a way that the pressure inside second oil separator 33 detected by second high pressure sensor H2 becomes higher than the pressure inside first oil separator 23 detected by first high pressure sensor H1. Due to such a pressure difference, oil L in second oil separator 33 can be forcibly supplied to first compression section 21 without disposing an ejection valve in first base pipe Q10 (the ejection valve is, for example, for regulating the ejection of oil L from first oil separator 23, and would be disposed at a position closer to first oil separator 23 than the position, where first base pipe Q10 connects to oil supply pipe 51, is).

Based on the detection results of first and second oil amount detectors 211E and 212E, controller 62 determines whether or not the amount of oil L in each of all the compressors (first and second compressors 211 and 212) of first compression section 21 has reached or exceeded the second threshold (step S4). When controller 62 determines that the amount of oil L has not reached or exceeded the second threshold in all the compressors of first compression section 21 (step S4: NO), controller 62 performs the process of step S4 after a predetermined period of time. When controller 62 determines that the amount of oil L in each of all the compressors of first compression section 21 has reached or exceeded the second threshold (step S4: YES), controller 62 closes second oil supply valve 525 of second regulating mechanism 522 and also restarts the control of first and second pressure reducing valves 41 and 44 based on the detection result of an outside air temperature, thereby ending the first oil supply control (step S5), and starting first control. (Step S1).

On the other hand, when oil amount estimator 61 estimates that the amount of oil L in first oil separator 23 is not less than the first threshold (step S2: NO), oil amount estimator 61 estimates whether or not the amount of oil L in second oil separator 33 is less than the first threshold by using substantially the same method as the process of step S2 (step S6). When oil amount estimator 61 estimates that the amount of oil L in second oil separator 33 is not less than the first threshold (step S6: NO), after a predetermined period of time, for example, oil amount estimator 61 estimates whether or not the amount of oil L in first oil separator 23 is less than the first threshold (step S2).

On the other hand, for example, when the amount of oil L in second oil separator 33 is estimated to be less than the first threshold because the amount of oil L in fourth compressor 312 is less than the second threshold (step S6: YES) as illustrated in FIG. 5, controller 62 starts the second oil supply control (step S7). Controller 62 opens first oil supply valve 523 of first regulating mechanism 521 at the start of the second control. Such control maintains the state in which oil L in first oil separator 23 is supplied to first and second compressors 211 and 212, as in the first oil supply control. Oil L in first oil separator 23 is also supplied to one of third compressor 311 and fourth compressor 312, that is, to the compressor in which the amount of oil L is less than the second threshold. In addition, controller 62 can forcibly supply oil L in first oil separator 23 to second compression section 31 by controlling first and second pressure reducing valves 41 and 44 so that the pressure inside first oil separator 23 becomes higher than the pressure inside second oil separator 33.

Based on the detection results of third and fourth oil amount detectors 311E and 312E, controller 62 determines whether or not the amount of oil L in each of all the compressors (third and fourth compressors 311 and 312) of second compression section 31 has reached or exceeded the second threshold (step S8). When controller 62 determines that the amount of oil L has not reached or exceeded the second threshold in all the compressors of second compression section 31 (step S8: NO), controller 62 performs the process of step S8 after a predetermined period of time. When controller 62 determines that the amount of oil L in each of all the compressors of second compression section 31 has reached or exceeded the second threshold (step S8: YES), controller 62 closes first oil supply valve 523 of first regulating mechanism 521 and also restarts the control of first and second pressure reducing valves 41 and 44 to adjust the pressure in first and second oil separators 23 and 33 to be a target high pressure value, thereby ending the second oil supply control (step S9), and starting first control. (Step S1). The processing of steps S1 to S9 described above is performed until the user issues a command to end the operation of refrigeration apparatus 1.

As described above, refrigeration apparatus 1 performs first control to circulate oil L in each of refrigeration units 2 and 3 when the amounts of oil L in first and second oil separators 23 and 33 are equal to or greater than a first threshold, that is, when the amount of oil L in each of all the compressors of first compression section 21 and second compression section 31 can be adjusted to be equal to or greater than a second threshold by supplying oil L circulating in each of refrigeration units 2 and 3. On the other hand, refrigeration apparatus 1 performs first oil supply control to supply oil L in the second refrigeration unit to first compression section 21 of first refrigeration unit 2, for example, when the amount of oil L in first oil separator 23 is less than the first threshold, that is, when the amounts of oil L in all the compressors of first compression section 21 cannot be increased to the second threshold or more by supplying oil L circulating in first refrigerating unit 2. As described above, refrigeration apparatus 1 can appropriately supply oil L separated by first and second oil separators 23 and 33 to first and second compression sections 21 and 31 according to the situation.

Variations of Embodiment

The present disclosure is not limited to the embodiments described above, and various modifications can be made without departing from the scope of the present disclosure. Moreover, the embodiments described above and variations described below may be combined in any way as long as appropriate function can be obtained.

For example, it is possible not to provide first and second oil supply check valves 524 and 526 in first and second regulating mechanisms 521 and 522. Exemplary flow control mechanism 52 including first and second regulating mechanisms 521 and 522 is described above; however, oil supply pipe 51 may be configured from only one pipe, and the flow control mechanism may be configured from one electromagnetic valve or electric valve disposed in the pipe. When oil supply pipe 51 is configured from only one pipe, a flow control mechanism may be configured from a tube pump disposed in the pipe, and the direction in which oil L flows may be controlled to be switched by rotating a rotation body of a tube pump forward or backward.

An exemplary configuration in which controller 62 switches between the first control, the first oil supply control, and the second oil supply control based on the estimation results of oil amount estimator 61 is described above. However, the following configuration is also possible: a controller switches the oil return destination based on the first control from a user and operation from an operation section switching between the first oil supply control and the second oil supply control. The user may manually switch between first and second oil supply valves 523 and 525, thereby switching the oil return destination without using a controller.

Oil amount estimator 61 may estimate whether or not the amount of oil L in each of oil separator 23 and 33 is less than the first threshold by disposing a detector in each of oil separator 23 and 33 for detecting the amount of oil L in each of oil separator 23 and 33, and estimating based on the detection results from the detectors.

In first oil supply control, for example, controller 62 controls pressure reducing valves 41 and 44 in such a way that the pressure in second oil separator 33 becomes higher than the pressure in first oil separator 23. However, pressure reducing valves 41 and 44 may be controlled in such a way that the pressure in each of oil separators 23 and 33 is adjusted to become the target high pressure value, as in the first control. Pressure reducing valves 41 and 44 may also be controlled in the second oil supply control in such a way that the pressure in each of oil separators 23 and 33 is adjusted to become the target high pressure value.

Refrigeration apparatus 1 may include three or more refrigeration units disposed in parallel in a refrigeration cycle. In this case, a plurality of oil supply pipes connecting the oil return pipes of the respective refrigeration units to each other may be provided, and a flow control mechanism may be disposed in each oil supply pipe.

INDUSTRIAL APPLICABILITY

The present disclosure is applicable to a refrigeration apparatus.

REFERENCE SIGNS LIST

1 Refrigeration apparatus
1A Refrigerator
1B Cooling unit
2 (First) refrigeration unit
3 (Second) refrigeration unit
4A First subcooling mechanism
4B Second subcooling mechanism
5 Oil return control mechanism
6 Control device
21, 31 First and second compression sections
22, 32 First and second heat dissipation heat exchangers
23, 33 First and second oil separators
41 First pressure reducing valve
42 First intermediate cooler
43 First split heat exchanger
44 Second pressure reducing valve
45 Second intermediate cooler
46 Second split heat exchanger
47 Third pressure reducing valve
48 Evaporator
51 Oil supply pipe
52 Flow control mechanism
61 Oil amount estimator
62 Controller
211, 212, 311, 312 First, second, third, and fourth compressors
211A, 212A, 311A, 312A First, second, third, and fourth low-stage suction ports
211B, 212B, 311B, 312B First, second, third, and fourth low-stage discharge ports
211C, 212C, 311C, 312C First, second, third, and fourth high-stage suction ports
211D, 212D, 311D, 312D First, second, third, and fourth high-stage discharge ports
211E, 212E, 311E, 312E First, second, third, and fourth oil amount detectors
221, 321 First and second heat dissipation fans
222, 322 First and second intercoolers
223, 323 First and second gas coolers
224, 324 First and second outside air temperature sensors 431, 432, 461, 462 First, second, third, and fourth flow channels
511, 512 First and second oil supply base pipes
513, 514 First and second oil supply branch pipes
521, 522 First and second regulating mechanisms
523, 525 First and second oil supply valves
524, 526 First and second oil supply check valves
CV1, CV2, CV11, CV12 Check valve
H1, H2 First and second high pressure sensors
P1, P2, P3, P4, P5, P6, P7, P8, P9, P10, P21, P22, P23, P24, P25, P26, P27, P28, P29, P30, P41, P42, P43, P44, P45, P46, P47, P48, P49, P50, Q1, Q2 Pipe
Q10, Q20 First and second base pipes
Q11, Q12, Q21, Q22 First, second, third, and fourth branch pipes
V1, V2, V3, V4 First, second, third, and fourth oil valves
V11, V13 First and second gas return electric valves
V12, V14 First and second liquid return electric valves

The invention claimed is:

1. A refrigeration apparatus, comprising:
N refrigeration units each including a compressor, an oil separator, an oil return pipe that returns oil separated from a refrigerant by the oil separator to the compressor, and a heat dissipation heat exchanger that cools the refrigerant from which the oil has been separated, N being a natural number equal to or greater than 2;
N pressure reducing valves each being provided downstream of the heat dissipation heat exchanger of a corresponding one of the N refrigeration units;
N pressure sensors each being provided in a pipe connected between a corresponding one of the N pressure reducing valves and the compressor of a corresponding one of the N refrigeration units;
an oil return control mechanism that controls a return destination of the oil separated by at least one of the oil separators of the N refrigeration units;
a controller that controls the oil return control mechanism; and
an oil amount estimator that estimates an oil amount in each of the oil separators,
wherein:
the oil return control mechanism includes
an oil supply pipe that connects the oil return pipes of the N refrigeration units to each other, and
a flow control mechanism disposed in the oil supply pipe, the flow control mechanism controlling a flowing condition of oil in the oil supply pipe,
the flow control mechanism includes a plurality of regulating mechanisms disposed in the oil supply pipe,
each of the plurality of regulating mechanisms includes an oil supply valve and an oil supply check valve disposed in series, and
when the oil amount estimator estimates that an amount of oil in one oil separator among the N refrigeration units is below a threshold value, the controller is configured to control the N pressure reducing valves to raise a pressure detected by one of the N pressure sensors relative to a pressure detected by another one of the N pressure sensors, the another one being provided in a refrigeration unit whose oil separator is estimated to have the oil amount below the threshold value.

2. The refrigeration apparatus according to claim 1, wherein:
the oil supply check valve in each of the plurality of regulating mechanisms is disposed so as to allow oil to flow only in one direction.

3. The refrigeration apparatus according to claim 2, wherein the controller performs
first control to circulate oil in each of the N refrigeration units by closing all the oil supply valves, and
second control to supply, into the compressor of a predetermined refrigeration unit among the N refrigeration units, oil in another refrigeration unit among the N refrigeration units by opening the oil supply valve of a regulating mechanism that allows oil to flow to the predetermined refrigeration unit, the regulating mechanism being one of the plurality of regulating mechanisms in the oil supply pipe connected to the oil return pipe of the predetermined refrigeration unit.

4. The refrigeration apparatus according to claim 3, wherein
each of the N refrigeration units further includes an outside air temperature detector that detects an outside air temperature, wherein
when the first control is performed, the controller controls the N pressure reducing valves in such a way that pressure in each of the oil separators is adjusted to be a target high pressure value based on the outside air temperature detected by the corresponding outside air temperature detector, and
when the second control is performed, the controller controls the N pressure reducing valves in such a way that the pressure in the oil separator of the another refrigeration unit becomes higher than the pressure in the oil separator of the predetermined refrigeration unit.

5. The refrigeration apparatus according to claim 3, wherein the controller performs
the first control when the oil amount estimator estimates that the oil amount in each of the oil separators of all the refrigeration units is equal to or greater than a threshold, and
the second control when the oil amount estimator estimates that the oil amount in the oil separator of the other refrigeration unit is less than the threshold.

6. The refrigeration apparatus according to claim 5, wherein:
in the compressors, oil amount detectors each detecting an oil amount in a corresponding one of the compressors are respectively disposed, and
the oil amount estimator determines whether or not the oil amount in each of the oil separators is less than the threshold based on a detection result of at least one of the oil amount detectors.

7. A refrigeration apparatus, comprising:
N refrigeration units each including a compressor, an oil separator, an oil return pipe that returns oil separated from a refrigerant by the oil separator to the compressor, and a heat dissipation heat exchanger that cools the refrigerant from which the oil has been separated, N being a natural number equal to or greater than 2;
N pressure reducing valves each connected to the heat dissipation heat exchanger of a corresponding one of the N refrigeration units; and
an oil return control mechanism that controls a return destination of the oil separated by at least one of the oil separators of the N refrigeration units, wherein:
the oil return control mechanism includes
an oil supply pipe that connects the oil return pipes of the N refrigeration units to each other, and
a flow control mechanism disposed in the oil supply pipe, the flow control mechanism controlling a flowing condition of oil in the oil supply pipe, the flow control mechanism includes a plurality of regulating mechanisms disposed in the oil supply pipe, each of the plurality of regulating mechanisms includes an oil supply valve and an oil supply check valve disposed in series, the oil supply check valve in each of the plurality of regulating mechanisms is disposed so as to allow oil to flow only in one direction, the refrigeration apparatus further comprises a controller that controls the oil return control mechanism, wherein the controller performs first control to circulate oil in each of the N refrigeration units by closing all the oil supply valves, and second control to supply, into the compressor of a predetermined refrigeration unit among the N refrigeration units, oil in another refrigeration unit among the N refrigeration units by opening the oil supply valve of a regulating mechanism that allows oil to flow to the predetermined refrigeration unit, the regulating mechanism being one of the plurality of regulating mechanisms in the oil supply pipe connected to the oil return pipe of the predetermined refrigeration unit, each of the N refrigeration units further includes an outside air temperature detector that detects an outside air temperature, wherein when the first control is performed, the controller controls the N pressure reducing valves in such a way that pressure in each of the oil separators is adjusted to be a target high pressure value based on the outside air temperature detected by the corresponding outside air temperature detector, and when the second control is performed, the controller controls the N pressure reducing valves in such a way that the pressure in the oil separator of the another refrigeration unit becomes higher than the pressure in the oil separator of the predetermined refrigeration unit.

8. A refrigeration apparatus, comprising:

N refrigeration units each including a compressor, an oil separator, an oil return pipe that returns oil separated from a refrigerant by the oil separator to the compressor, and a heat dissipation heat exchanger that cools the refrigerant from which the oil has been separated, N being a natural number equal to or greater than 2;

N pressure reducing valves each connected to the heat dissipation heat exchanger of a corresponding one of the N refrigeration units; and an oil return control mechanism that controls a return destination of the oil separated by at least one of the oil separators of the N refrigeration units, wherein:

the oil return control mechanism includes an oil supply pipe that connects the oil return pipes of the N refrigeration units to each other, and a flow control mechanism disposed in the oil supply pipe, the flow control mechanism controlling a flowing condition of oil in the oil supply pipe, the flow control mechanism includes a plurality of regulating mechanisms disposed in the oil supply pipe;

each of the plurality of regulating mechanisms includes an oil supply valve and an oil supply check valve disposed in series; and the oil supply check valve in each of the plurality of regulating mechanisms is disposed so as to allow oil to flow only in one direction, the refrigeration apparatus further comprises a controller that controls the oil return control mechanism, wherein the controller performs first control to circulate oil in each of the N refrigeration units by closing all the oil supply valves, and second control to supply, into the compressor of a predetermined refrigeration unit among the N refrigeration units, oil in another refrigeration unit among the N refrigeration units by opening the oil supply valve of a regulating mechanism that allows oil to flow to the predetermined refrigeration unit, the regulating mechanism being one of the plurality of regulating mechanisms in the oil supply pipe connected to the oil return pipe of the predetermined refrigeration unit, the refrigeration apparatus further comprises an oil amount estimator that estimates an oil amount in each of the oil separators, wherein the controller performs the first control when the oil amount estimator estimates that the oil amount in each of the oil separators of all the refrigeration units is equal to or greater than a threshold, and the second control when the oil amount estimator estimates that the oil amount in the oil separator of the other refrigeration unit is less than the threshold, in the compressors, oil amount detectors each detecting an oil amount in a corresponding one of the compressors are respectively disposed, and the oil amount estimator determines whether or not the oil amount in each of the oil separators is less than the threshold based on a detection result of at least one of the oil amount detectors.

* * * * *